United States Patent [19]
DeValroger et al.

[11] 3,806,785
[45] Apr. 23, 1974

[54] BRUSHLESS D. C. ELECTRIC MACHINE

[75] Inventors: Pierre Albert Marie DeValroger; Marius Lavet, both of Paris, France

[73] Assignee: Anvar Agence Nationale pour la Valorisation de la Recherche, Puteaux, France

[22] Filed: June 1, 1972

[21] Appl. No.: 258,489

Related U.S. Application Data
[63] Continuation of Ser. No. 44,705, June 9, 1970, abandoned.

[30] Foreign Application Priority Data
June 10, 1969  France .............................. 69.19106

[52] U.S. Cl. .................. 318/254, 318/138, 318/439
[51] Int. Cl. .......................................... H02k 29/00
[58] Field of Search ................... 318/254, 133, 439

[56] References Cited
UNITED STATES PATENTS

| | | | |
|---|---|---|---|
| 3,585,474 | 6/1971 | Kobayashi | 318/254 |
| 3,386,019 | 5/1968 | Hill | 318/138 |
| 3,590,353 | 6/1971 | Kobayashi | 318/254 |
| 3,042,847 | 7/1962 | Welch | 318/254 |
| 3,242,405 | 3/1966 | Ikegami | 318/138 |
| 3,274,471 | 9/1966 | Mocgala | 318/439 |
| 3,611,081 | 10/1971 | Watson | 318/254 |
| 3,461,367 | 8/1969 | Takeyasu et al. | 318/254 |
| 3,339,133 | 8/1967 | Favre | 318/138 |

*Primary Examiner*—G. R. Simmons
*Attorney, Agent, or Firm*—Flynn & Frishauf

[57] ABSTRACT

The invention relates to a D.C. brushless electric motor which comprises a rotor formed by a permanent magnet which is the seat of a magntic field directed along at least one diameter of the rotor, and a three-phase stator whose three windings, connected in star at one end, are connected at their other ends to the positive or negative terminal of a source of direct or rectified current, each through two electronic switching members with opposite polarities, wherein the assembly of switches is controlled by an angular position sensor driven by the rotor, and actuated to supply the windings of the three phases by currents of the same shape, but offset through 120°, and having an amplitude which varies by steps of the same value and of a duration corresponding to at maximum a 60 electrical degrees of rotation of the rotor between a positive and a negative peak values, the minimum positive step being separated from the minimum negative step by a step of same duration having a zero value, said motor comprising rotor and stator structures so arranged that the reluctance of the gap is substantially constant during a rotation of the rotor through 360 electric degrees, an induction type position sensor being driven by the rotor shaft to control the electronic switching members, and wherein there is provided between the rotor and the position sensor adjustable coupling means allowing the angle, formed between the vector representing the magnetic flux of the rotor and the vector representing the rotating flux of the stator, to be given an optimum value.

16 Claims, 35 Drawing Figures

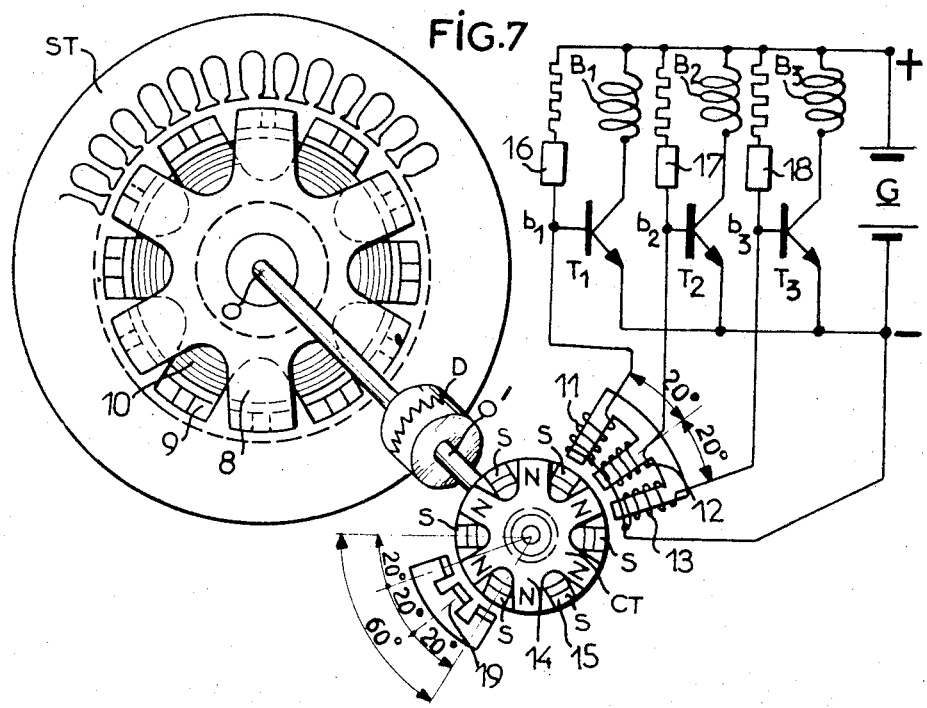
FIG.7
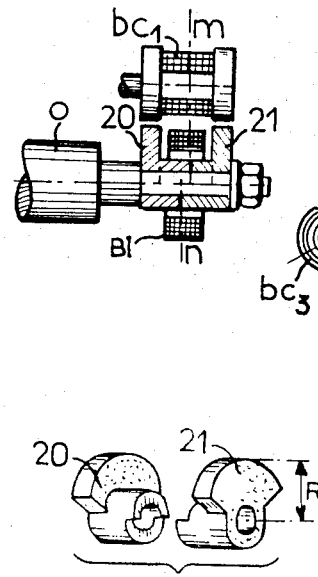
FIG.8a
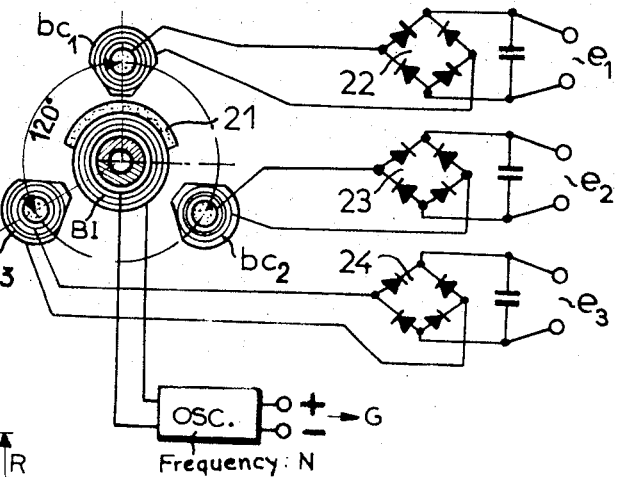
FIG.8b
FIG.8c

FIG.13a  FIG.13b  FIG.14
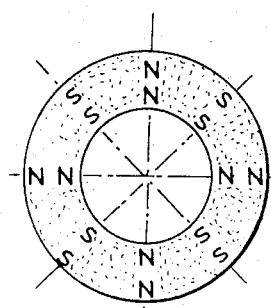
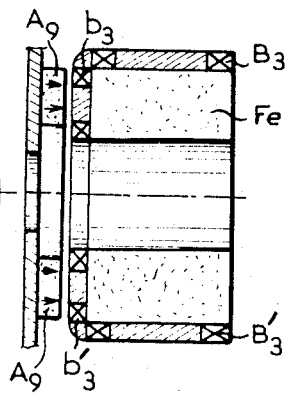
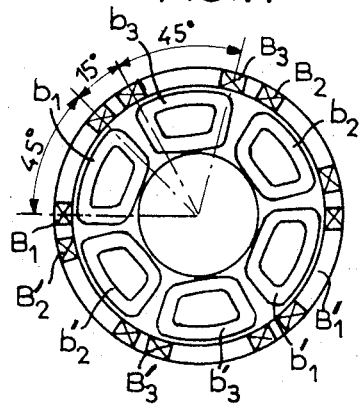
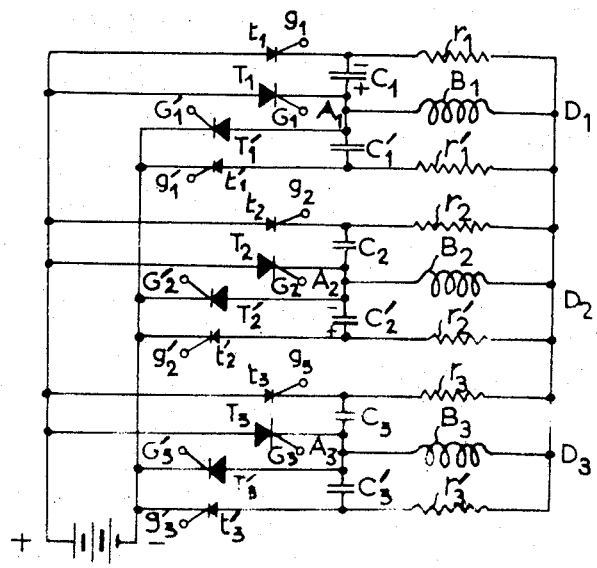
FIG.15
FIG.16

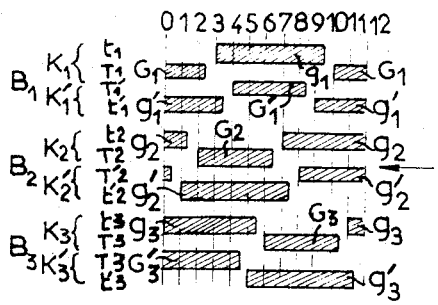
FIG.17
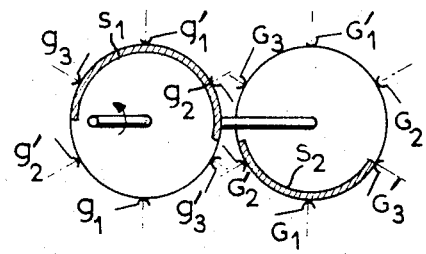
FIG.19
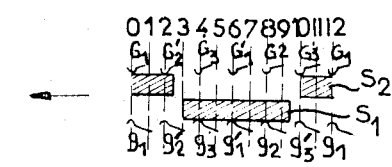
FIG.18
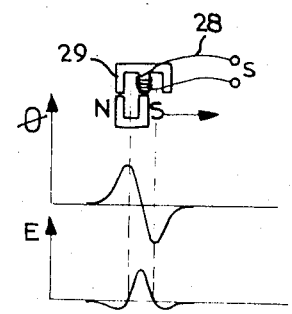
FIG.20
FIG.22
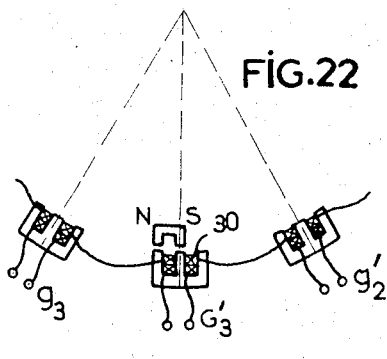
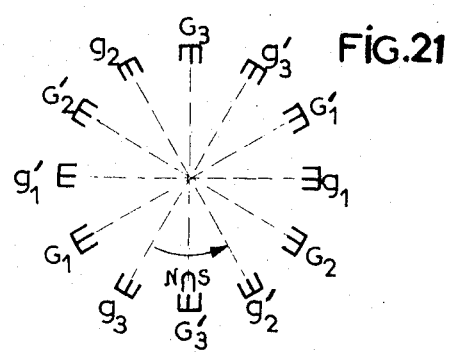
FIG.21
FIG.23
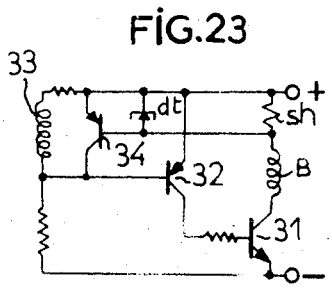
FIG.24a   FIG.24b
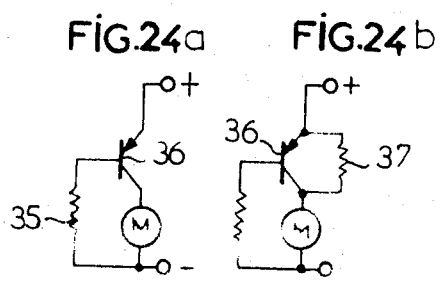

BRUSHLESS D. C. ELECTRIC MACHINE

This application is a continuation of U.S. Ser. No. 44,705, filed June 9, 1970, now abandoned.

The invention relates to a brushless D.C. motor with electronic commutation. Motors of this type are already known, comprising a rotor consisting of a permanent magnet or of a core carrying a coil supplied with D.C., thereby to generate a magnetic field directed along a diameter of the rotor, and a three-phase stator, mounted in star circuit and supplied by a D.C. source through three pairs of electronic switching devices controlled by an angular position sensor which rotates with the rotor, the stator being supplied with current emissions of the same wave forms but angularly displaced relative to each other by an angle of 120°, so as to form a rotating field, generating a magnetic flux co-acting with the magnetic field generated by the rotor and entraining the same in rotation.

In certain motors of this type, the emissions of current, offset through 120° and supplying the stator windings, are present in the form of rectangular pulses. In other motors these currents pulses have the form of pulses, the amplitudes of which increase and decrease by increments or in steps to approach a sine-shaped curve, wherein every step extends over a duration corresponding to the rotation of the rotor through 60 or 30 electrical degrees.

In particular, a motor of this type described in the British Pat. No. 1,048,471 has a rotor which consists of a permanent bipolar magnet with radial magnetization, the two lateral faces of which are formed by two longitudinal parallel planes arranged on either side of the radial plane of symmetry, passing through the axis of the shaft of the motor and forming at the two radial ends of this magnet two poles which extend over the whole length of the rotor and over a small part of the circumference, whilst the three windings of the three-phase winding of the stator are each supplied by a pair of phototransistors controlled by light sources mounted on the rotor and rotating opposite a blocking disc which is fixed and has slots in the form of circular arcs behind which the photo-transistors are mounted, wherein each of the current pulses, offset through 120°, has an amplitude which rises to a positive peak value, then decreases to a negative peak value by steps of equal magnitude and each extending over 30°, so as to produce a quasi-sinusoidal wave form.

However, motors of this type have drawbacks which prevent them from being realized as motors having a comparatively high power output, for example as motors providing electrical traction for vehicles.

In fact, the magnetic flux generated by the stator may be expressed as follows:

$$\Phi_s = K\ NI/R$$

where K is a constant, NI are the ampere-turns (or magneto-motive force) developed by the three windings of the stator, which are in star circuit, and R is the reluctance of the magnetic circuit. In the known motors, in which the motor has narrow poles in the circumferential direction, the reluctance of the gap which is important for the total value R of the reluctance of the magnetic circuit, varies substantially during every revolution of the rotor, so that the rotating flux $\Phi_s$ produced in the magnetic circuit by the rotating stator field is not constant.

The driving torque acting on the rotor may be expressed as follows:

$$M = K\Phi_r\Phi_s \sin \alpha$$

where $\Phi_r$ is the vector representing the magnetic flux generated by the rotor, $\Phi_s$ is the vector representing the rotating flux generated by the three-phase stator, and $\alpha$ is the angle comprised between the two vectors representing these two fluxes. The driving torque is zero if $\alpha = 0°$, and is at maximum with $\alpha = 90°$. Since the reluctance of the gap varies during one revolution of the rotor, the rotor tends to stop in positions in which one of its poles is opposite a pole of the stator, whilst in the intermediate positions, offset relative to each other through 90°, and corresponding to successive positions of the vector representing the rotating flux $\Phi_s$ of the stator, its position is unstable so that, e.g., with a hexapolar stator, the rotor, instead of moving by rotational fractions equal to 30° as the flux $\Phi_s$ of the stator, moves by 60° jumps. Under these conditions, even if the angle $\Phi$ is originally adjusted to an optimum value (which must, in fact, be substantially lower than 90°, as indicated by a more thorough calculation) the rotor does not turn with a continuous movement but with a jerky motion which causes sudden variations of the angle $\alpha$, and thereby gives rise to a motor torque which varies within wide limits during every revolution. These periodic variations of the driving torque prevent the construction of high power motors according to this principle, which are intended to supply a large torque, and more particularly of motors which can be used for the electric traction of vehicles.

The motor according to the present invention makes it possible to eliminate a large part of the disadvantages of known motors outlined above. This motor comprises a rotor formed by a permanent magnet which is the seat of a magnetic field directed along at least one diameter of the rotor, and a three-phase stator whose three windings, connected in star at one end, are connected at their other ends to the positive or negative terminal of a source of direct or rectified current, each through two electronic switching members with opposite polarities, wherein the assembly of switches is controlled by an angular position sensor driven by the rotor, and actuated to supply the windings of the three phases by currents of the same shape, but offset through 120°, and having an amplitude which varies by steps of the same value and of a duration corresponding to at maximum a 60 electrical degrees of rotation of the rotor between a positive and a negative peak values, the minimum positive step being separated from the minimum negative step by a step of same duration having a zero value, said motor comprising rotor and stator structures so arranged that the reluctance of the gap is substantially constant during a rotation of the rotor through 360 electric degrees, an induction type position sensor being driven by the rotor shaft to control the electronic switching members, and wherein there is provided between the rotor and the position sensor adjustable coupling means allowing the angle formed between the vector representing the magnetic flux of the rotor and the vector representing the rotating flux of the stator to be given an optimum value.

The invention also relates to other improvements to a motor of this kind, making it possible to increase its power, the driving torque, and also the rotational speed of the motor, wherein these improvements concern the electronic switching devices as well as the position sensors which permit the switching devices to be controlled with a high degree of accuracy in time.

The invention will be explained in more detail in the following description of several embodiments shown in the attached drawings and which are given by way of non-limiting examples in which:

FIG. 1 to 6c illustrate the principle of a brushless D.C. electric motor according to the invention angular position sensor being diagrammatically represented as a mechanical commutator.

FIG. 7 is a schematic illustration of an improved motor fitted with a permanently energized multipolar rotor and with a conventional laminated three-phase stator, the three phases of the stator being connected through transistor relays to a D.C. source and the intermittent currents that pass through the phases being distributed by means of a position sensor of the electro-magnetic induction type comprising at least three armature windings.

FIGS. 8a, 8b and 8c illustrate a modified form of the means for sensing angular position, the function of which is to provide signals for operating the electronic switching members.

FIG. 9b is a diagram showing the functioning of one of the transformers of the arrangement shown in FIG. 9a.

FIGS. 10, 11, 12, 13a, 13b, and 14 illustrate a construction of an improved motor comprising a multipolar rotor turning about a stator fitted with two three-phase windings of which one forms part of the sensing means, these windings being constituted by flat coils having no ferromagnetic cores.

Figure 1:
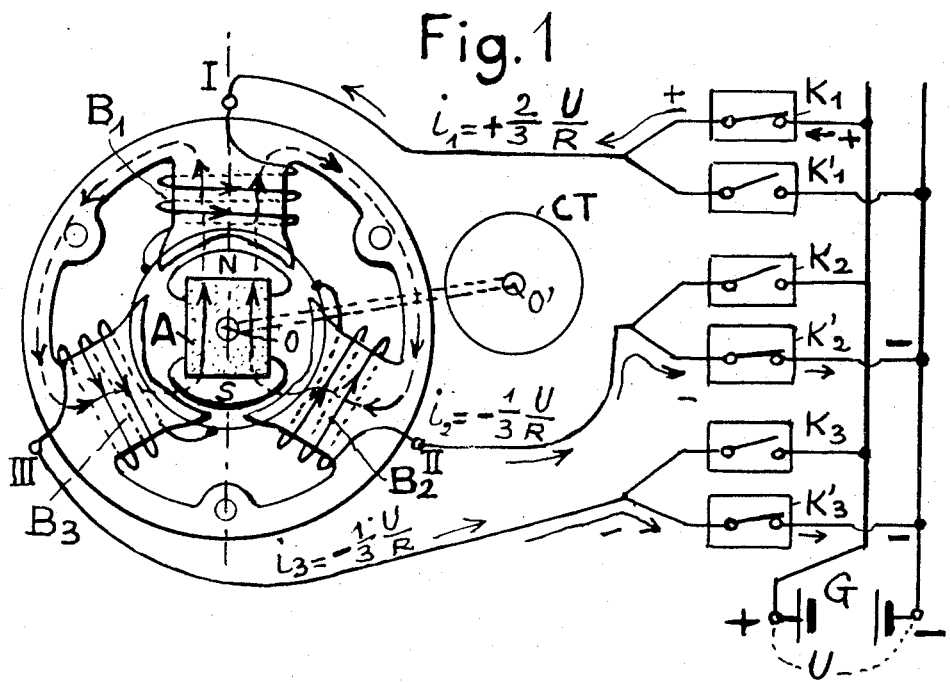
Figure 2:
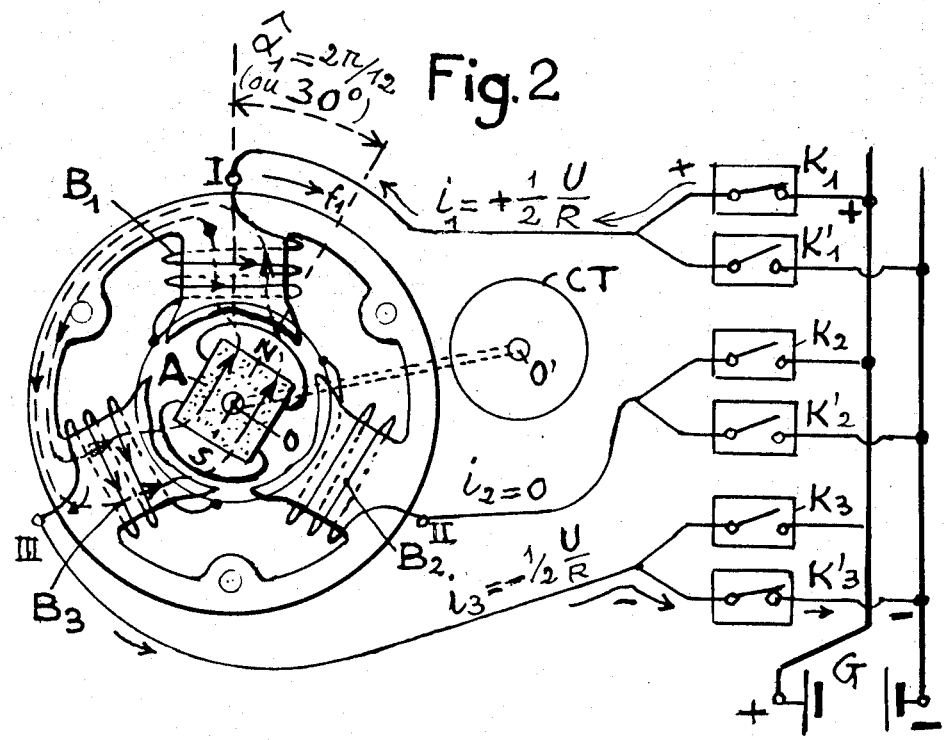
Figure 3:
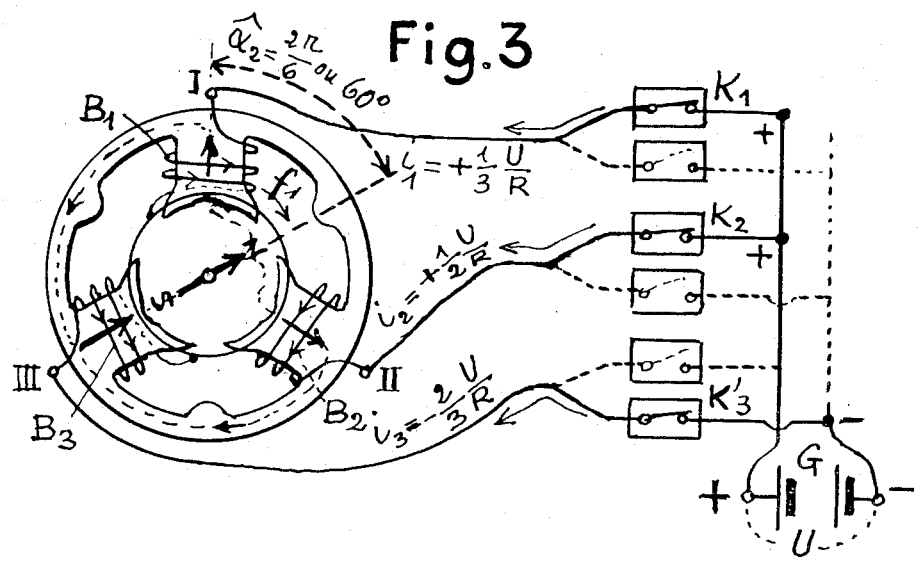

FIG. 15 reiterates and tabulates the different successive positions of the six circuit-breakers illustrated in FIGS. 1 to 3, during one revolution, i.e., through 360°.

FIG. 16 shows one way of connecting 12 thyristors for providing the switching operation resulting from the successive positions of the above-mentioned circuit-breakers.

FIGS. 17 and 18 show in developed form one possible design of the cylindrical rotating contactor which controls this switching operation, when the brushes are aligned along a generator or when they are distributed over the circumferential face of the cylinder.

FIG. 19 is a perspective view illustrating the latter arrangement.

FIG. 20 shows an inductive sensing means for exciting a thyristor and indicates, in a graph, the corresponding form of pulses.

FIG. 21 shows how much sensing means are used, the inductors, connected to the gates of the thyristors, being fixed, and the single armature being constituted by a permanent magnet.

FIG. 22 shows an arrangement of inductive sensing means having two windings for automatic start-up.

FIG. 23 shows a device for limiting the intensity of the start-up force, this being more particularly suitable for high power transistor systems.

FIG. 24a, 24b shows an example for the use, in connection with the machines of the invention, of an intensity limiting device employing a power transistor, and also a transistor associated with a resistor.

Figure 25:
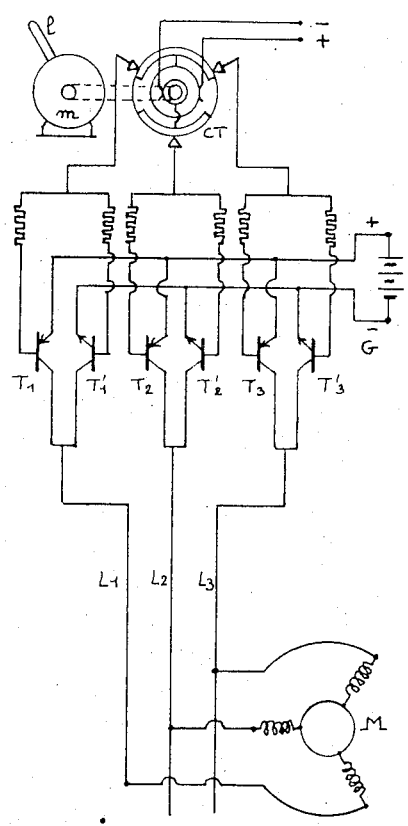
Figure 26:
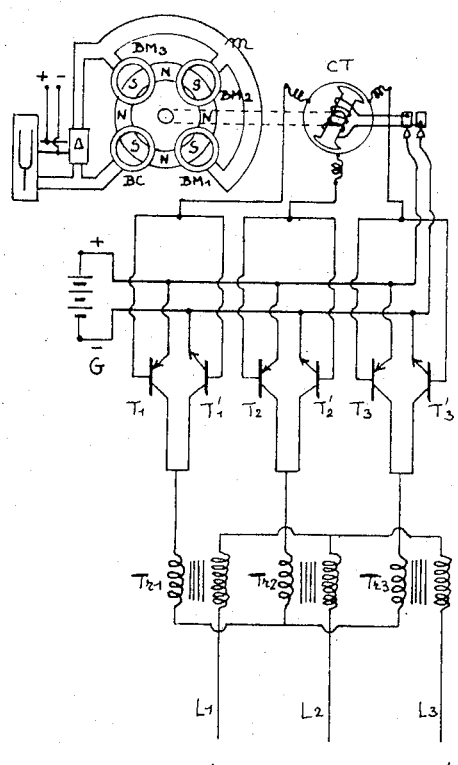

FIGS. 25 and 26 illustrate two arrangements of the means in accordance with the invention for producing polyphase currents having a variable or fixed frequency.

Figure 27:
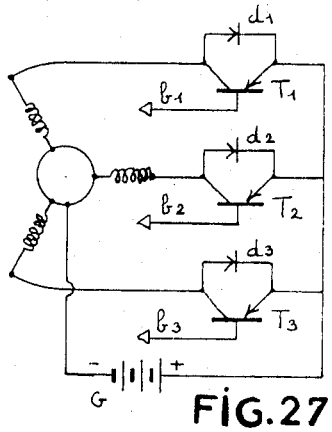

FIG. 27 illustrates an arrangement for effecting reversal, i.e., a possible means for changing the direction of rotation of the motor.

Figure 28:
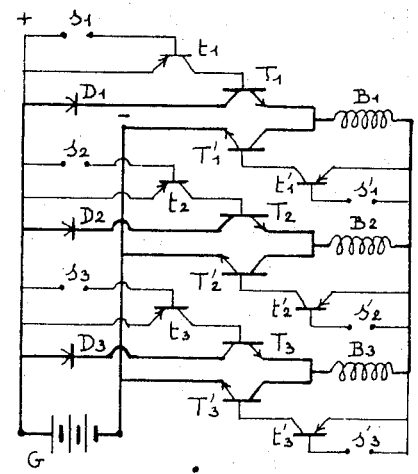

FIG. 28 illustrates an arrangement of the electronic switching means for supplying current to the polyphase windings of the motor by means of transisors only of the NPN type.

The figures comprising the attached drawing should be regarded as simplified illustrations, some schematic, intended to make the following description more clear. The control circuits could obviously be supplemented by auxiliary protective means and it would be possible to add to the electronic relays the preamplification stages well known to persons familiar with the art. Certain elements common to the various arrangements have been designated by the same reference letters.

FIG. 1 illustrates the general principle of the improved motors of the present invention and, in order to make the description casier, the electromagnetic drive elements are shown in the form of a conventional design of three-phase synchronous machine. This construction comprises a double-pole rotor fitted with a transverse permanent magnet NS and with a stator having three cores arranged radially at intervals of 120°, these cores being surrounded by identical star-connected coils $B_1$, $B_2$ and $B_3$. The electric energy is rovided by a unidirectional current source G (accumulator set, fuel battery, means for rectifying current connected to a mains....).

The coils fitted around the rotor NS receive intermittent currents $i_1$, $i_2$ and $i_3$ suitably distributed by six electronic relays anf preferable by static semi-conductor relays such as transistors or thyristors. To make the circuit arrangement in the simplified illustration in FIG. 1 clearer, the relays in question have been represented by simple rectangles, each one of which contains the usual symbol for a standard circuit breaker. Each phase of the motor, such as $B_1$ is catered for by a pair of relays such as $K_1$ and $K'_1$, the connections with the source G being established in the manner indicated in the sketch. It will be seen that there are six current paths between the terminals of the source G and the outer ends I, II and III of the coils $B_1$, $B_2$ and $B_3$. Each coil-end can be connected either to the positive pole or to the negative pole with the help of a control means actuated by the shaft O of the motor. In FIGS. 1 and 2, this control arrangement has simply been indicated by a circle CT; it can be achieved in various ways. For the purpose of bringing the relays $K_1$, $K'_1$, $K_2$, $K'_2$, $K_3$ and $K'_3$ into action, there are various known sensing and signal-emitting means influenced by the speed and angular position of the rotor NS. Convenient position sensors will be detailed later, after having indicated the order of the automatic signals which permit, under the best conditions, establishment of combinations of currents which can produce a magnetic field rotating through small fractions of a revolution, and which thus enable thr rotor NS to be driven, thereby developing uninterruptedly a high motor torque.

FIGS. 1, 2 and 3 show, by way of an example, three combinations of current-strength $i_1$, $i_2$ and $i_3$, as well as the directions of the current for moving the magnetic driving field by successive rotations of 30°, that is to say, by one-twelfth of a revolution. In the sketches, the force lines of the magnetic fields to be considered are illustrated by broken lines and arrows.

With U connoting the voltage at the terminals of the source G, and R the resistance of a phase winding, it will be seen that a final position of the rotor is reached, as indicated in FIG. 1, when the relays $K_1$, $K'_2$ and $K'_3$ permit passage of the following currents:

$$i_1 = +\tfrac{2}{3} \cdot U/R, \; i_2 = -\tfrac{1}{3} \cdot U/R \text{ and } i_3 = -\tfrac{1}{3} \cdot U/R$$

The other relays must interrupt the circuits in which they are included.

The magnetic driving field set up by the stator turns through 30° in the direction $f_1$, as indicated in FIG. 2, when the relays $K_1$ and $K'_3$ are the only one operating and ensure passage of the following currents:

$$i_1 = +\tfrac{1}{2} \cdot U/R, \; i_2 = 0 \text{ and } i_3 = -\tfrac{1}{2} \cdot U/R$$

A fresh movement through 30° of the driving field is obtained by the combination shown in FIG. 3, the currents for which are:

$$i_1 = +\tfrac{1}{3} \cdot U/R, \; i_2 = +\tfrac{1}{3} \cdot U/R \text{ and } i_3 = -\tfrac{2}{3} \cdot U/R$$

The sensing means CT should be so designed that one revolution of the shaft O enables 12 different current combinations, similar to those described above, to be obtained in succession and that the changes of combinations occur after rotations through 30°. Furthermore, the positioning of the sensing means CT in relation to the rotor should be such that the driving field set up by the stator is at all times directed forwardly of the line of the poles NS of the rotor. The conditions stated make it possible to develop an electromagnetic torque which is always along the direction $f_1$ of the movement. It will be noted that when the rotor reaches the position shown in FIG. 1, it is necessary for the electric connection shown in FIG. 2 to be established slightly in advance so that the magnet NS is effectively pulled in the direction of the arrow $f_1$.

Figure 4:
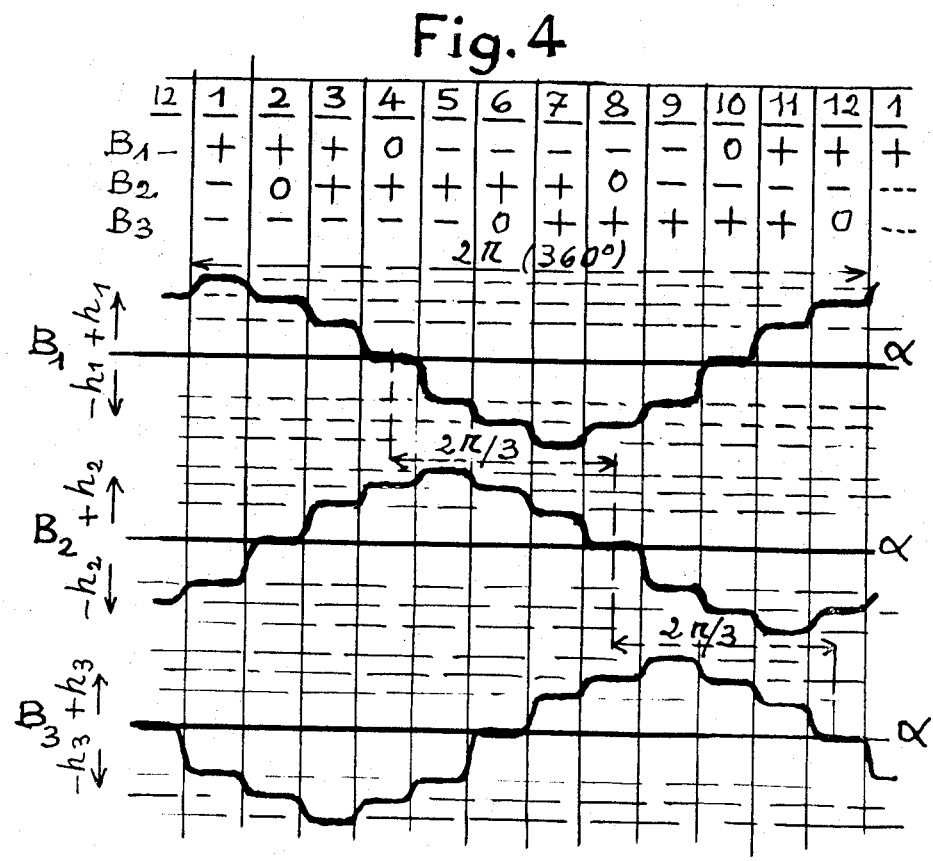

By means of a table and three curves, FIG. 4 illustrates on the one hand the combinations of positive and negative polarities applied to the ends I, II and III of the stator coils and, on the other hand, the values of the corresponding magnetic fields (energizing ampere-turns) which act in the cores of the coils $B_1$, $B_2$ and $B_3$. When the shaft O of the motor is turning at a low constant speed, $\omega = d\alpha/dt$ in the direction $f_1$, the size and direction of the fields $\pm h_1$, $\pm h_2$ and $\pm h_3$ in the cores of the coils are shown on the y-axis of the three curves in FIG. 4, and the angular positions $\alpha$ of the rotor are on the x-axis. These curves are of stepped form and the ascending and descending steps have a width corresponding to 30° (or $2\pi/12$ radians).

When the motor is turning at high speed, the corners of the steps become rounded as a result of the inductance of the windings with oppose the sudden variations of the magnetic flux and, in these conditions, the curves of FIG. 4 which represent the component fields are very much like three sinusoids offset by $2\pi/3$. Ignoring the unimportant harmonics, (which could in any case be reduced by using various known filters), it can be said that the alternating fields created by the currents are close to those which occur in the stator of a conventional three-phase motor fed by sinusoidal currents. The resultant magnetic field which drives the rotor is thus a field which rotates at a mean speed that always remains equal to the speed of the shaft O solidly connected to the sensing means CT. The intensity of this rotating field fluctuates slighty; however, in order completely to avoid fluctuations in the speed of the rotor, it is expedient as far as possible to render uniform the active magnetic flux, that is to say the flux that results from the composition of the permanent flux of the magnet NS and the alternative fluxes set up in the cores of the coils.

In order to prevent the rotor NS from moving in a succession of jerks, and to avoid transient reductions in the driving torque, it has been found very expedient to avoid sudden changes in the reluctance of the magnetic circuits which become deformed. The pole pieces of the stator and of the rotor are so formed that, in the absence of currents, the mean permeance of the magnetic circuits energized by the magnet NS remains substantially constant and that the motor, not connected to the source G, can easily turn without being firmly held in certain angular positions by the torques resulting from magnetic attraction. In the case of the double-pole three-phase motor, this result is obtained by providing the magnet NS and the cores of the coils with wide pole pieces, the shapes of which can be seen in FIG. 1. The edges of the pole pieces could be cut obliquely so as to substitute a progressive distribution of the field below each pole for the rectangular distribution. It will also be possible to replace the stator having three projecting poles by a stator comprised of a stack of silicon-iron sheets having the form of a toothed ring fitted with three windings contained in closed or partially closed slots.

Figure 5:
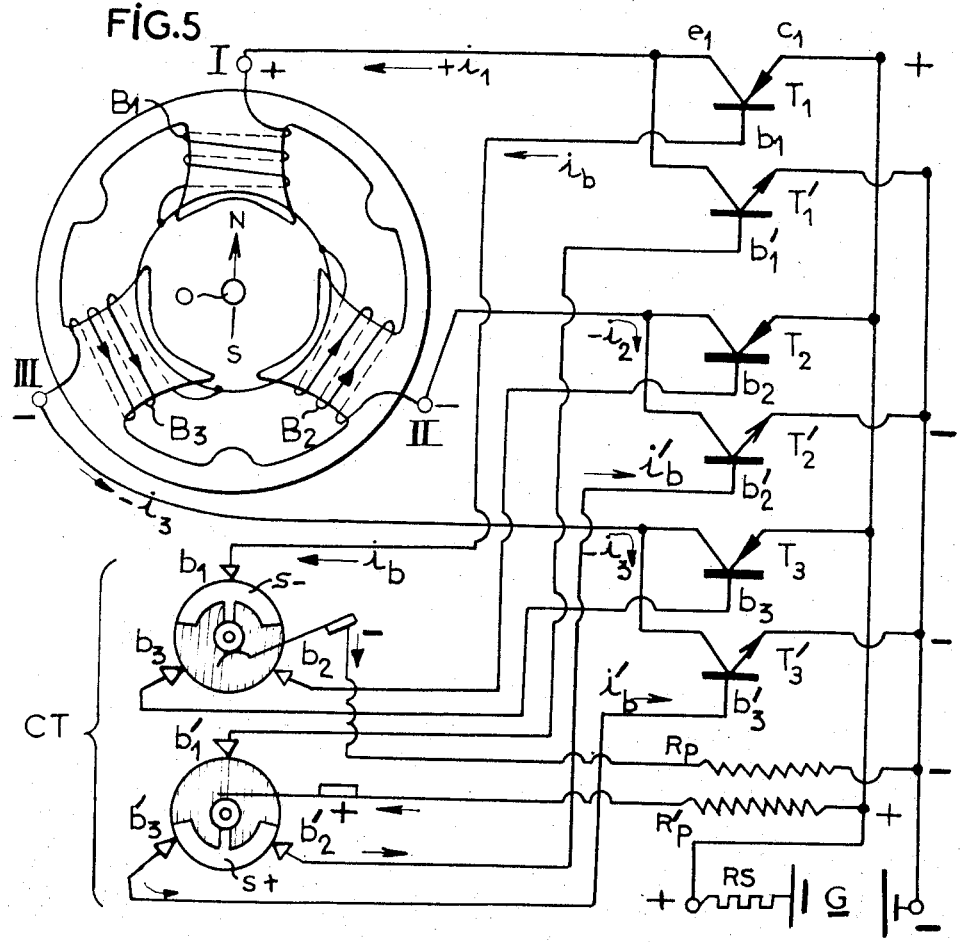

FIG. 5 shows a first form of the components indicated at $K_1$, $K'_1$ .......$K_3$ and at CT in FIG. 1. The three pairs of relays for feeding the coil $B_1$, $B_2$ and $B_3$ are constituted by six transistors. Three of these transistors ($T_1$, $T_2$ and $T_3$) are of the PNP type and their emitter electrodes are connected to the positive terminal of the energy-source G. The other transistors $T'_1$, $T'_2$ and $T'_3$ are of the NPN type and their emitters are connected to the negative terminal. The collectors of the six transistors are connected respectively to the terminals I, II and III of the stator winding as shown in the circuit diagram. The transducer for sensing the angular position, which is solidly connected to the shaft O of the motor, is constituted by two rotating distributors in the form of cylinders, parts of which are conducting and on which bear two groups of brushes arranged, in each group, at distance apart of 120°: on the one hand $b_1$, $b_2$, and $b_3$ are connected respectively to the bases of the transistors $T'_1$, $T'_2$ and $T'_3$. One of the distributors comprises a conducting sector ($s-$) having an angular extent of approximately 150°, constantly connected to the negative pole of the source G through a strong non-inductive resistor $Rp$. The other distributor comprises a conducting sector ($s+$), diametrically opposite the sector $s-$; this second sector is connected to the positive pole of the source by a strong resistor $Rp'$. When a negative potential of suitable value is applied to the base of the transistor $T_1$, this element becomes conducting and allows a current $+i_1$ to pass into the coil $B_1$. At the same time, the positive polarity is applied to the bases of the transistors $T'_2$ and $T'_3$ which also become conducting and permit passage of the current $-i_2$ into the coil $B_2$, and of the current $-i_3$ into the coil $B_3$. The field which results from the magnetomotive forces developed in the coils assumes the direction indicated by the arrow SN. It will be seen that the system just described behaves like the arrangement shown in FIG. 1. The distributor and sensing means CT driven by the shaft O of the motor permit a succession of combinations of magnetic fields to be obtained, the effects of which have been previously explained by reference to FIG. 2, 3 and 4.

Because f the amplifying properties of the transistors, the switching of strong motor currents $i_1$, $i_2$ and $i_3$ is achieved by means of feeble signals constituted by minimal currents so that the sensing means CT is not adversely affected by sparks.

Figure 6A:
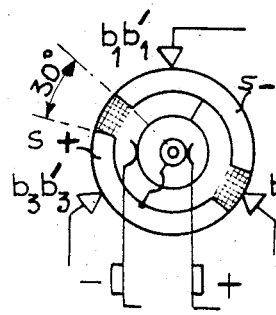
Figure 6B:
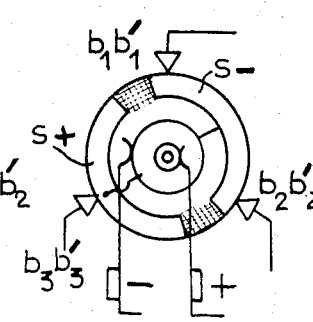
Figure 6C:
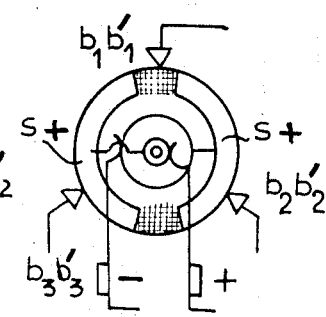

FIG. 6 shows a modified form of the position-sensing means CT illustrated in FIG. 5. The double distributor is replaced by a single cylinder made of insulating material and provided with two symmetrically disposed conducting sectors (s + ans s —). These sectors are connected respectively to the positive and negative poles of the energy source by means of rings and brushes. FIGS. 6a, 6b and 6c illustrate three positions of this selector switch which can connect the poles of the energy source to the control electrodes of the transistors in twelve different ways.

It will be readily appreciated that various alterations to the circuits and different choices of electronic components for passing strong alternating currents into the three-phase winding $B_1$, $B_2$ and $B_3$ can be made. The electronic relays $T_1$, $T'_1$ ... $T'_3$ could obviously be replaced by various combinations of semi-conducting junctions which are well known to those familiar with the art, and in particular by static relays comprising several amplification stages, the object being finally to establish three-phase magnetic fields which vary progressively as indicated by the graphs of FIG. 4.

The sensing means previously described can be replaced by selector-switch arrangements which do not call for the use of moving electric circuit breakers of the type having sliding contacts or in which conducting parts are moved towards each other. In particular, use can be made of transducers of the electro-magnetic induction type which are influenced simultaneously by the angular position, speed and direction of rotation of the magnets. The intermittent conductivity of transistors or thyristors could also be controlled by elements which react to the angular position of the rotor but are not affected by its speed. The control means that can be adapted for use with multipole and multiphase motors include mutual induction sensing means constituted by transformers comprising in the main a primary winding through which passes an auxiliary alternating current, and at least one secondary winding which generates the signal, the inductive coupling of the windings depending upon the angular position of the rotor.

On the other hand it is to be noted that it is not absolutely necessary for the obtention of a rotating magnetic field with a three-phase stator, to supply to the three windings thereof quasi-sinusoidal currents having alternately positive and negative half-waves as shown in FIG. 4: it is sufficient to distribute currents in said windings in such a manner that the three magnetic fluxes shifted through 120° which are produced by the stator vary in a quasi sinusoidal manner with a periodical sign inversion according to the algebriscal sum of the fluxes generated in the windings. Such a distribution of currents in the stator windings may be obtained by means of a simplified switching device comprising only one switching transistor for each phase winding as shown in FIG. 13, one of the three transistors being successively made conductive, or three different combinations of two transistors, and all the three transistors being made non conductive corresponding to the zero steps of the quasi-sinusoidal magnetic flux.

FIG. 7 illustrates, by way of example, an improved motor of the multipole type, the general principle of which has been explained above. The motor of FIG. 7 is switched with the help of an electro-magnetic induction sensing means designed to provide three-phase control signals. The permanently magnetized rotor comprises twelve staggered peripheral poles obtained from two pieces of steel 8 and 9 having curved interlacing pole teeth, (which construction is known per se and is employed in particular in the alternators for motorcars). The pieces 8 and 9 are interconnected by a core through which the motor shaft O passes and which is surrounded either by a double-pole annular magnet which is magnetized axially, or by a coil 10 through which direct current continuously passes. The laminated stator ST is identical to that use in a three-phase heteropolar alternator having six pairs of poles. In the diagram in FIG. 7, the stator coils are shown symbolically by the coils $B_1$, $B_2$, $B_3$ drawn outside the stator ST so that the arrangement of the stator circuits can be better understood. These coils are connected intermittently to the source G by means of at least 3 transistors $T_1$, $T_2$, and $T_3$, the conductivity of which depends upon the position and the speed of the sensing device CT. This latter element is constituted by a small three-phase alternator which comprises three fixed coils 11, 12 and 13 mounted on cores arranged in the manner shown in the sketch. It will be seen that the polar ends of the cores are a small distance from an inductor comprising 12 staggered peripheral poles N, S, N, S ...

The induction-sensing means CT is advantageously constructed in the same way as the rotor 8 – 9 – 10; it is constituted by two iron toothed rings 14 and 15, applied to the circular faces of a central annular double-pole magnet, the internal force lines of which are parallel to the shaft. The inductor pole rings comprise teeth arranged at intervals of 30°, so that the periphery of the inductor CT carries an array of poles N and S at regularly spaced intervals. The cores of the coils 11, 12 and 13 are arranged radially, and the distance between them is equal to two-thirds of the pole-pitch of the inductor CT, the expression "polar-pitch" here meaning the distance between two consecutive poles NS. In these conditions, the alternative electro-motive forces induced in the coils 11, 12 and 13 are three-phased and their period corresponds to the time required by the shaft O to cover one-sixth of a revolution. The voltages applied to the bases of the transistors are phase-shifted precisely through one-third of a cycle, but are not sinusoidal; their shape can be precisely fixed by an appropriate choice of the widths of the fixed and moving pole pieces of the sensing means. In this way, it is easy to control the precise times at which reversals of the magnetic flux occur in the coils 11, 12 and 13 and, consequently, to control the duration of the output currents passing into the motive coils $B_1$, $B_2$ and $B_3$. It is thus possible to establish optimum operating conditions in accordance with the curves shown in FIG. 4; finally, by means of methodical tests, it will be possible to select that distance between the shaft O and the sensing means CT that enables the maximum driving torque to be obtained; (this choice could be rendered easier by means of an adjustable coupling means D).

In order to increase the reliability of operation and to ensure automatic starting up of the motor with a considerable torque, use can be made of auxiliary sensing means adapted to initiate the passage of motive currents when the rotor is stopped or is turning at a very low speed. Such auxiliary sensing means can act for example, on the positive bias of the bases of the transistors $T_1$, $T_2$ and $T_3$ by reducing at the required time the values of the resistors 16, 17 and 18 shown in the sketch constituting FIG. 7. In particular, resistors are known, the value of which automatically varies according to the position of a strongly magnetized rotor; these resistors are constituted by semi-conductor plates made of materials, the conductivity of which is greatly altered by the magnetic fields passing therethrough. Plates of this kind could be arranged between the rotating inductor CT and a fixed magnetic circuit comprising three laminated cores positioned at 19 as indicated in the schematic sketch of FIG. 7. Automatic startup can, however, be achieved more simply by the use of one fixed bias for one of the three phases. It is then essential to hold the rotor in the non-operating position by, for example, placing a fixed magnet near the rotor. Thus, neither friction nor sliding contact occur.

These basic arrangements however carry the difficulty of reducing the starting torque. To eliminate this difficulty, the invention envisages the concurrent use of a clutch or centrifugal coupler which connects the element to be driven to the motor, once the latter has started up.

The invention also envisages the possibility of maximum-torque start-up by means of a position sensor, the principle of which has already been described, particularly in connection with FIG. 5, and of fitting this sensing means with a device for automatically lifting the brushes, for example of the centrifugal force type, or any other equivalent system; after the position sensor has been put out of action, the sensing means of the electromagnetic induction type will ensure that switching takes place without the use of electric contacts.

FIG. 8 shows schematically another type of multiphase signal generator which could be used in connection with the above described motors. Two parts 20 and 21 having very good magnetic permeability and high resistivity are fitted on one end of the shaft of the motor. These parts can be made of a material moulded from iron powder bonded by an insulating bonding agent; they are shown separately and in perspective in FIG. 8. When fitted, these parts behave like a cylindrical core disposed along a line extending the shaft, said core having at its ends two eccentric pole pieces in the form of sectors having a radius R, and extending over 150°. These sectors are located opposite each other, and the core is surrounded by a coil BI coaxial with the shaft O, there being slight gap between core and coil. This central core is held stationary by an appropriate support, not illustrated in the sketch there passes continuously through the core a low alternating current of high frequency N (for example, of audio-frequency) provided by an auxiliary electric oscillator OSC supplied by the power-source for the motor. Parts 20-21 form a U-shaped rotating ferromagnetic inductor, comprising means for generating an alternating flux having a frequency N. In the following description, this conductor will be referred to as the "inductor".

The circular contours of the sectors of the rotating inductor rest on a cylindrical surface having a radius R and, around this surface there are equidistantly arranged three fixed coils $bc_1$, $bc_2$ and $bc_3$ the geometric axes of which are parallel to the axis of the rotor. These coils comprise cores and flanges made of a high-permeability ferromagnetic material similar to the material of the parts 20-21. The flanges of the coils are bevelled and the reduced pole portions are disposed along three radii, 120° apart. The eccentric sectors of the parts 20-21 move past the coils close to the bevelled edges of their flanges. It can be seen that when the sectors of the inductor are positioned in front of a coil $bc_1$ for instance, its winding is inductively coupled with the central coil BI. This coupling is very tight since a fully closed ferromagnetic circuit is formed. The magnetic coupling action between BI and the coils $bc_2$ and $bc_3$ is practically zero. In certain positions of the rotating inductor, the central coil BI can be coupled with two outer coils but, in this case, the current induced in the third coil is zero.

The above-described arrangement behaves in the same way as a variable coupling transformer supplying three intermittent A.C. voltages between the terminals of the secondary coils $bc_1$, $bc_2$ and $bc_3$. These voltages can be rectified by means of full wave rectifiers 22, 23 and 24 and filters. Finally, the C.C. voltages $e_1$, $e_2$ and $e_3$ are obtained, the values of which depend upon the angular position of the rotary inductor and, therefore, upon the position of the shaft O of the motor.

By means of a combination of two rotary inductors operating in the same way as the arrangement shown in 8, it would also be possible to provide a unit generating six signals and having the characteristics of the control system illustrated in FIG. 5; these signals would permit the release of currents having alternate directions, creating three alternating fields varying stepwise as indicated by the curves of FIG. 4.

Figure 9A:
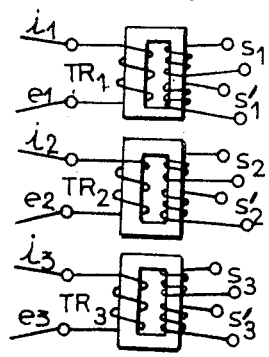
FIG. 9a illustrates schematically three special transformers added to the sensing means of FIG. 8b so as to provide successive signals which, when required, can supply and interrupt high-strength motive currents by means of thyristor relays.
Figure 9B:
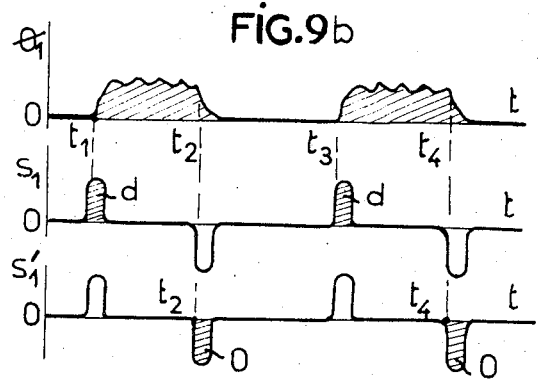

FIGS. 9a, and 9b relate to an arrangement which is particularly suitable for motors which are switched by means of thyristors. In this case, it is of help to produce control signals constituted by a series of successive pulses adapted to initiate the passage of motive currents, and then to interrupt the currents at suitable times.

It is known that the thyristor is a rectifier, the conduction of which in the direct sense is initiated by an electrode known as the gate. When direct current is being used, it is necessary to provide an auxiliary circuit able to provide supplementary pulses to switch off the thyristor and consequently to block the circuit served by this element. In one type of improved motor in accordance with the present invention, a switching operation using thyristors is controlled by adding three transformers $TR_1$, $TR_2$ and $TR_3$ to the means for generating three-phase signals illustrated in the sketches constituting FIG. 8. These transformers are shown separately in FIG. 9a; each of them comprises on the one hand a primary circuit receiving an intermittent D.C. voltage such as $c_1$, and on the other hand, two secondary circuits providing the pulses as shown in the curves arranged one above the other in FIG. 15b, time t being indicated on the x-axis.

The first of these curves shows the flux $\Phi_1$ which is rapidly set up in the magnetic circuit of the transformer $TR_1$ between the times $t_1$ and $t_2$, then $t_3$ and $t_4$ and so on, the magnetic flux being virtually uninterrupted in the time intervals, $t_2$ $t_3$, for instance. The rises and falls in the flux occur suddenly and the value of the maximum flux which is set up in the intervals $t_1$ $t_2$ for example can be kept at a high and constant level by saturation of the ferromagnetic material of the core of the transformer $TR_1$. During the rapid increases in the flux $\Phi_1$, which occur at the times $t_1$, $t_3$, etc., an electromotive force $s_1$ in a fixed direction, which will be considered as the positive direction, is induced in one of the secondary windings. This electro-motive force $s_1$ is in effect proportional to the derivative $d\Phi_1/dt$. At the moments $t_2$, $t_4$ ..., the magnetic core of the transformer becomes suddenly demagnetized and this change in the flux has the effect of inducing a negative electro-motive force. The same phenomena occur in the other secondary winding of the transformer $TR_1$, and it will be seen that it is possible to produce short impulses of alternating direction which follow one after the other as indicated by the curves $s_1$ and $s'_1$ of FIG. 15b.

By means of electric valves or diodes, it is a simple matter to prevent, in each control circuit, the passage of current pulses having a particular sign. In these conditions it is possible to produce:

a. by one of the secondary windings of the transformer $TR_1$, a series of pulses intended to cause triggering actions, that is to say, to close working circuits (pulses marked $d$ and shaded in the curve $s_1$), and b. by the other secondary winding of the transformer $TR_1$, a complementary series of pulses for opening working circuits (pulses marked $o$ and shaded in the curve $s'_1$).

The transformers $TR_2$ and $TR_3$ (FIG. 9a) will enable the thyristors associated with the second and third phases of the motor to be switched on and switched off at suitable times.

The motors operating on a multiphase electronic switching system and forming the subject matter of the present invention, could be constructed using various kinds of electromagnetic elements. In particular, it is possible to use stator windings that are not embedded in slotted iron sheets, (such as the sheets ST illustrated in FIG. 7. In this case, the copper conductors directly receive Laplace forces $f = BLI$, B signifying the acting magnetic induction, L the length of the conductor normal to B, and I the electric current. FIGS. 10 to 14 show an example of the construction of a motor comprising a fixed winding containing no iron, driving a rotor having multipole magnets, said winding giving an increased output thanks to the reduction of the hysteresis losses and eddy currents in the parts supporting the electric conductors.

The rotor of this motor is constituted by a smooth-surfaced wheel which surrounds the stator. This wheel contains eight magnets $A_1$, $A_2$ ... $A_8$, in the form of "tiles" arranged in a circle, the interior pole surfaces being staggered. This heteropolar inductor is laid out in the manner illustrated in FIG. 12b, described above. The magnets are bonded to the inner surface of an iron envelope 25, in the form of a deep-drawn cup which is solidly connected to the central shaft 0. This shaft is quided in ball bearings fitted in a sectional frame 26–27 (illustrated in part in the longitudinal section shown in FIG. 17). The three-phase windings of the stator are of small thickness in the radial direction. They cover a fixed toroidal core constituted either by a ring Fe having good magnetic permeability and made of powdered material bonded by means of an insulating bonding agent, or by a ring made of non-ferromagnetic insulating plastics material. The conductors for the motor winding are fixed by bonding. The winding is preferably fully surrounded by an insulating covering made of hardened plastic material and adhering firmly to the support F3.

Figure 12:
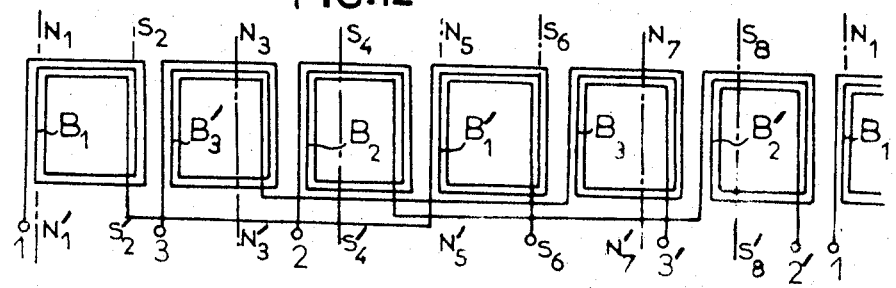

FIG. 12 is a sketch showing, in developed form, the three-phase motor winding. It will be seen that this winding is constituted by thin flat coils applied to the outer cylindrical surface of the central support Fe. The first phase comprises the coils $B_1$ and $B'_1$; the second phase is formed by coils $B_2$ and $B'_2$ and the third phase by the coils $B_3$ and $B'_3$. The active conductors extending along the generatrices of the outer cylindrical surface, form bundles which are suitably placed with regard to the polar zones of the rotor; (the axes of these polar zones are indicated in FIG. 12 by parallel lines $N_1$ $N'_1$, $S_2$ $S'_2$, $N_3$ ... $S_8$ $S'_8$).

Figure 10:
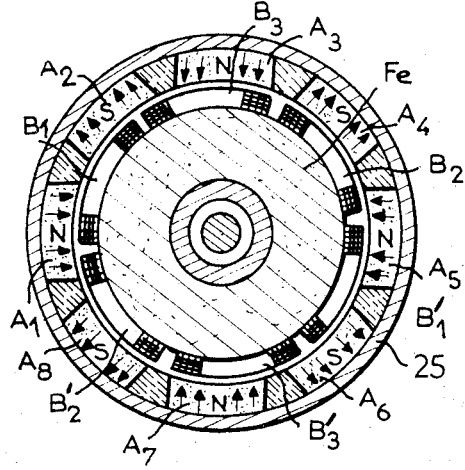
Figure 11:
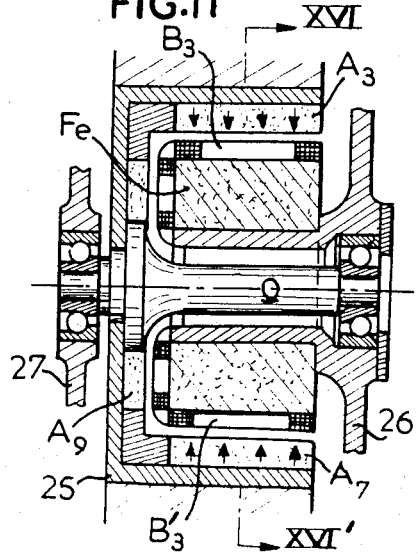

For switching the rotor shown in FIGS. 10 and 11 use can be made of the transducer sensing devices previously described. Preferably however, the use is envisaged of a sensing means of the electromagnetic induction type and occupying little space; this could be readily accomodated in the construction shown in FIG. 11. This signal-producing means is formed by a very flat multiple magnet $A_g$, which rotates in front of a three-phase winding on the annular front face of the support Fe. The magnet $A_g$ and the coating winding are shown separately in FIGS. 19 and 20. The winding is constituted by thin flat coils of approximately trapezoidal form, the edges being arranged along radii. The coils form three phases: $b_1 + b'_1$, $b_2 + b'_2$ and $b_3 + b'_3$. The magnet $A_g$ is a thin disc through which pass force lines parallel to the shaft of the motor; it produces three-phase alternating currents capable of controlling an electronic switching means similar to that described above by reference to FIG. 7.

It will be noted that it is possible to position, opposite the coil Fe, three generators using the Hall effect, and thus to form a means for sensing angular positions that is capable of sending triggering signals when the rotor is stopped. A sensing means of this kind facilitates the production of a self-starting motor which rotates in a particular direction, the direction of rotation being reversed easily by permutation of the two-phase wires.

A description will now be given of the branch circuits provided when the currents fed to the motor coils B are switched with the help of means operating on an "on or off" basis, as is the case with the conventional thyristors.

It is known that the thyristors pass from the blocked to the conducting condition by a short pulse being applied to their gates. For the passage of current in the reverse direction, a further pulse on an appropriate element is required. In the case of the conventional thyristor, this may be switched off by means of a small auxiliary thyristor. This has the effect of short-circuiting the principal thyristor but also of reversing the direction of the current in the thyristor through the discharge of a condenser C.

The use of the above arrangements which the motor shown in FIGS. 1 to 3 will thus necessitates six power thyristors and six auxiliary switching off thyristors.

To show this, reference will first be made to the table in FIG. 15 showing the successive positions of the six previously mentioned circuit breakers K during one revolution of the rotor, i.e., through 360°. The letter O indicates that the circuit breaker is open and that the corresponding circuit is interrupted. The letter F indicates that the circuit breaker is closed and that the current is flowing.

The numbers across the top of the table correspond to the successive positions of the rotor, which positions are 30° apart, or to increasing times. The number O corresponds to an initial time, that in which the rotor is in the position indicated on FIG. 1. The numeral 2 corresponds to a rotation of the rotor through 30° in the clockwise direction, that is to say, it corresponds to FIG. 2. Similarly, the numeral 1 corresponds to FIG. 3. The cycle is completed at the numeral 12, which corresponds to the numeral O, and consequently to FIG. 1 which marks the start of a new cycle.

FIG. 16 shows what the connections of the 6 power thyristors T1, T'1, T2, T'2, T3 and T'3 can be for example, which thyristors replace the six power transistors of FIG. 5 to achieve the required branching off of the current. It shows the six corresponding FIGS. G1, G'1, G2, G'2, G3, G'3.

This figure also shows how the six switching off thyristors $t1$, $t'1$, $t2$, $t'2$, $t3$ and $t'3$ are branched off by their gates $g1$, $g'1$, $g2$, $g'2$, $g3$, $g'3$. These feed the charging resistors $r1$, $r'1$, $r2$, $r'2$, $r3$ and $r'3$ which are relatively highly rated. Also shown are the six condensers C1, C'1, C2, C'2, C3 and C'3, the effect of which is to discharge, reversing the current in the thyristor to be switched off.

At the beginning, when T1 is ignited as well as T'2, while T'3 has just been ignited, the three motor coils are fed in the manner indicated in FIG. 1. The end A1 of the winding B1 is positive in relation to the other end B1. The switching off thyristor $t1$ being extinguished, there is no voltage difference at the terminals of the resistor $r1$, since it is not fed with current. Rhe condenser C1 is then charged as indicated in FIG. 16. Similarly, T'2 being ignited and $t'2$ being extinguished, the condenser C'2 is charged as indicated in this figure.

At the moment 1, which corresponds to FIG. 2, the gato G'2 of T'2 has ceased to be fed. This is the moment when $t'2$ is ignited by sending a positive pulse to its gate $g'2$. This ignition short-circuits T'2 by sending to this thyristor an excess inverse current resulting from the discharge of C'2. T'2 is thus extibguished in a suro manner.

The feeding of a gate G has the effect of igniting the corresponding thyristor T by causing it to conduct the feed current B. The feeding of the opposite gate $g$ has the effect of igniting the auxiliary thyristor $t$ and extinguishing T, by cutting off the supply of current to B in the direction in which it had been established.

The resistor $r$ being great compared with those of the coils B, the current derivation in these resistors can be ignored and finally, by suitably igniting the 12 thyristors T and $t$, it can be said that the same result is obtained as by opening or closing the six circuits breakers K.

In practice it suffices to feed the required positive voltage to the 12 gates through suitable resistors, these successive feeds occurring at the various positions of the rotor, spaced 30° apart and indicated by the 12 reference numbers.

In one specific arrangement, described by way of example, the invention envisages the provision of this supply by means of a rotating cylinder made of insulating material and connected mechanically to the rotor. 12 insulated metallic sectors carried by this cylinder pass before 12 brushed aligned along a generatrix of the cylinder. The sectors are connected to a positive voltage source, whereas the brushes are connected to the gates through suitable resistors.

Such a generator, developed to give a flettened view, is illustrated in FIG. 17. The 12 sectors have been marked by the letters used for the 12 thyristors that they actuate, these letters being shown in the column on the left. The 12 generatrices are marked 0 to 12, the marking 0 corresponding to the marking 12 as has been seen previously. The arrow indicates how this arrangement, as developed, passes beneath the brushes which are not illustrated here so as to make the drawing easier to read. If this arrangement is applied to the system illustrated in FIG. 1 the 12 brushes must be aligned on the generatrix marked 0.

The length of these twelve sectors could be reduced by dispensing with part of their right-hand ends. They could even be constituted merely by the left-hand end reduced to its leading edge, at least in the case of the conventional thyristors, the gates of which no longer need to be fed with current once ignition has been effected. At any rate, each sector will be reduced at its right-hand end, as shown in FIG. 17, since the gate $g$ and G of one and the same pair of thyristors cannot be fed simultaneously.

Instead of 12 sectors on a drum rotating with the rotor, use can be made of just two moving sectors passing before twelve brushes which are not aligned. They are arranged opposite each other to the right of the previous marked place having the even numbers. This is shown in FIG. 18, which is only a transposition of FIG. 17, and will thus be readily understood without additional detailed explanation.

FIG. 19 shows a specific form of the arrangements shown in FIG. 18. Two circular sectors S1 and S2, arranged on the peripheries of two discs attached to and rotating with the rotor are connected to a positive voltage source. 12 brushes, spaced apart by 60° and connected to the 12 gates as previously explained, slide over these two sectors.

However, it is possible to avoid all sliding contact as with transistors by using sensing means having non contacts, for example inductive sensing means. In this way, the invention envisages releasing the pulse which ignites the thyristors by inducing a voltage and then a current in a thin-wire winding 28 which ends at the terminals s connected between the cathode of the thyristor and its gate. By way of example, FIG. 20 shows this winding mounted on the middle branch of a three-branch laminated iron. A magnet NS, the two pole branches of which are the same distance apart as those of the iron 29, pass before the inductor so formed.

To illustrate the mode of operation of this sensing means FIG. 20 also shows the change in the flux $\Phi$ circulating in the central branch of the element 29 as a function of the position of the magnet NS. At the bottom, and by means of the same x-axis, the variation in the voltage E in the winding 28 is shown. Only the positive part can act on the gate of the controlled thyristor. Its ignition thus occurs when the positive point is developed, that is to say, when the two branches of the magnet NS straddle the central branch of the inductor.

The use of such sensing means is illustrated in a specific manner in FIG. 21. The moving magnet NS rotates in the direction of the arrow, being driven directly by the rotor for example. 12 inductors, angularly spaced at intervals of 30°, are arranged on the periphery in the order indicated in FIG. 21, which shows the gates connected to each inductor.

Automatic start-up of the motor switched in this way can be achieved by various known means. An original method, forming part of the invention, consists in arranging, on the middle branch of the inductor of the sensing means, a second winding 30 connected in series with those of the other inductors, as shown in FIG. 28. The rotor of the motor is shown in the stopped position, because of the pull occurring between the iron-core 29 of the inductor and the magnet NS. Thus, in FIG. 22, this magnet is positioned in front of the inductor G'3. When initially passing current to the windings 30 of the twelve inductors, current is induced in the windings 28. However, the arrangement may be such that only that inductor, the magnetic circuit of which is closed by the magnet is able to generate a current sufficient to ignite the thyristor.

Thus, in FIG. 22, only the thyristor T'3 will ignite. This is the particular thyristor that should be conducting so as to cause the motor to rotate.

However, use can equally well be made of the induction sensing means previously described and illustrated in FIGS. 8 and 9. Instead of 12 sensing windings, no more than six will be used. When the sector 20 and 21 shown in FIG. 8 begin to pass before one of these six sensing means, a thyristor T is caused to ignite as previously explained. When the sectors have completed their movement, a second pulse is produced and this ignites $t$ and consequently extinguishes T. The branches of the transformers shown in FIG. 9 whould obviously be in the appropriate direction.

In the transistor arrangement, the current upon start-up can be limited if no electro-motive counter-force has yet been developed; this is done in such manner that the power transistors are not saturated. This however causes them to heat up momentarily. This drawback can be avoided by the use of an automatic intensity limiting device.

FIG. 23 provides an example, based upon the use of a shunt arranged in series with the motor coil B. In the arrangement illustrated, the base of the transistor 31 responsible for the switching action is fed by an auxiliary transistor 32. The latter is actuated by the coil 33 of the inductive sensing means, the winding of which is connected between its emitter and its base, as in well-known arrangements. The limiting transistor 34, the base-emitter gap of which is connected to the terminals of the shunt sh, is saturated when the main current-strength becomes too great. It then short-circuits the holding coil and blocks the action this causing the current-strength to be shunted. A tunnel diode $td$, inserted at the terminals of the shunt, create instability and cause the flutter necessary for the power transistor to function purely as a switching means.

In thyristor arrangements, there exists numerous means for limiting current-strength, in automatic and purely static manner. The simplest method seems to consist in fitting a power transistor in series with the motor M as shown in FIG. 24a. The biassing resistor 35 of this transistor 36 will consequently be fixed. However, the invention aims at relieving this transistor by inserting an auxiliary resistor 37 at its terminals as shown in FIG. 24b. Upon start-up, this resistor intervenes, right at the beginning, to limit the current-strength. The total current-strength passing into the motor is in effect greater than that permitted by the transistor 36. In normal operation, the current-strength corresponds to the saturation of the transistor 36. The resistor 37 is then short-circuited and out of action.

Instead of a single transistor 36, three can be used, one for each phase. Also, several transistors can be arranged in series, this being indispensable when the voltage is high.

From the foregoing descriptions and explanations, it is possible to provide an arrangement comprising partly static and partly dynamic elements which would be capable of generating multiphase currents.

FIG. 25 shows at $m$, a small brushless electric D.C. motor of the type described above which actuates the transducer sensing means CT incorporating contacts, with sensing means diagrammatically illustrated as in FIG. 6. As has been explained, this sensing means trigger the base currents of six transistors T1, T'1, T2, T'2, T3, T'3 and generate a three-phase current along the lines L1; L2 and L3, as a result of the switching of these transistors. The motor M supplied by lines L1, L2, L3 is a conventional asynchronous motor.

By acting on the lever $l$ which alters the speed of the motor $m$, the frequency of the three-phase current produced is varied and consequently so is the speed of the moor M. If the D.C. source G is constituted by a three-phase bridge rectifier, fed by the fixed-frequency mains, this three-phase current is transformed into a variable frequency current. Similarly, a conventional asynchronous motor is converted into an autosynchronous motor similar to those described above.

However, the invention aims at extending the possibilities for generating these three-phase currents to motors other than asynchronous motors. Thus, the invention covers the production of fixed-frequency three-phase current from D.C. source constituted by a battery G.

FIG. 26 shows how such three-phase current could be generated, or put another way, it shows three-phase generator comprising a pilot motor supplied by a battery G and producing 220 volts at 50 cycles. The small motor m is here a brushless motor of the type described above, the rotor of which is a ferrite ring having eight poles. It is rotated by switching the direct current feeding the three motor coils BM1, BM2 and BM3 with the help of suitable signals provided by a sensor CT controlling the switching arrangement comprising transistors $T_1$, $T'_1$, $T_2$, $T'_2$, $T_3$, $T'_3$. A tuning fork oscillator, contained in the circuit, synchronizes the motor by means of an amplifier $\Delta$.

The sensing means CT, driven by the motor $m$, is merely a synchro-machine, the three-phase stator of which provides alternating currents, phase-shifted to the extent of $2\pi/3$, as the result of the rotation of a double-pole rotor which can be wound like that of a conventional synchro-machine, and then fed with direct current through two rings. The function of the transformers $Tr1$, $Tr2$ and $Tr3$ is to raise the voltage of the current produced, and they contribute to smooth the slight irregularities caused by the stepped currents provided by the switching arrangement.

It will be appreciated that in the case of all the arrangements discussed, the motors forming the subject-matter of the invention can rotate in both directions by permutating two phases, it being possible to apply this permutation to low currents which switch in the heavy currents.

The change in the direction of rotation can also be achieved by offsetting the sensing means CT in a suitable manner. It has been explained that it was necessary to offset this sensing means in the forward direction by an angle which is theoretically 90°. If offsetting is to the rear, the motor will rotate in the opposite direction.

The motor can be rendered reversible by fitting diodes at the terminals of the semi-conductors responsible for the switching operation. If a torque is applied to a motor to drive it a at excess speed, its back electromotive force becomes greater than the E.M.F. of the supply. The motor becomes a generator which then recharges the battery of accumulators used as the current source.

An example of the arrangement of such diodes is shown in FIG. 27 which is merely a transposition of the FIG. 7 showing a simplified switching arrangement employing three transistors. The diodes $d1$, $d2$ and $d3$ are fitted between the emitters and the collectors of the three transistors T1, T2 and T3.

In the previous arrangements, the use has been envisaged of complementary PNP and NPN transistors. These arrangements can be obtained with a single type of transistor, NPN for example. However, difficulty is encountered in completely saturating the transistors, the collectors of which are connected to the positive pole of the supply source. For this, it is necessary for the collectors to be at a lower potential than that of their base.

The invention aims at obtaining such result in a simple manner by providing one or more diodes between the positive pole of the source and the collectors in question. FIG. 28 which is merely a transposition of FIG. 3, shows the precise arrangement of the three diodes D1, D2 and D3, which thus ensure complete saturation of the three transistors T1, T2 and T3. In addition, this figure shows the six amplifying transistors t which feed the six power transistors T. The drawing also shows how the outputs of the impulse transformers TR of FIG. 15a, should be connected to act upon the six transformers $t$.

What we claim is:

1. A brushless D.C. electric motor of the type comprising a rotor provided with means for generating a constant magnetic field directed along at least one diameter thereof, and a three phase stator having three starconnected windings which are coupled at their other ends to the positive and negative terminals of a D.C. or rectified supply, each through two electronic switching means with opposed polarities respectively, an angular position sensor driven by the rotor and controlling the switching members to supply the three phase stator windings currents of the same quasi-sinusoidal shape but offset by 120° and having an amplitude which aries by steps of the same value and duration corresponding to at maximum, a 60 electrical degrees of rotation of the rotor between positive and negative peak values, the minimum positive step being separated from the minimum negative step by a step of same duration having a zero value, said motor comprising in combination:

rotor and stator structures so arranged that the total value of the reluctance of the magnetic circuits of the motor is substantially constant for all positions of the rotor during a rotation of the rotor through 360 electric degrees, an induction type position sensor having a rotor driven by the motor rotor shaft and a stator connected to said switching means, and adjustable coupling means between the rotor of the position sensor and the rotor shaft of the motor, the angle formed between the vectors representing the rotating flux of the three phase stator and the magnetic flux of the motor rotor being controlled to be at an optimum value.

2. A motor according to claim 1 wherein the motor rotor comprises a heteropolar inductor comprising at least one double-pole permanent magnet having wide pole pieces having an extent approximating a pole-pitch and being separated by narrow gaps, whereby the motor rotor is prevented from being acted upon by strong magnetic attraction or repulsion forces having particular directions in the absence of current.

3. A motor according to claim 1 having a laminated motor stator with narrow-mouthed slots and with a three-phase winding distributed in said slots, whereby the permeance of the annular air-gap is substantially constant.

4. A motor according to claim 1, wherein the motor stator is provided with two three-phase windings formed respectively by sets of conductors located a short distance from the pole faces of the motor rotor and directed at right-angles to the force lines passing from said motor rotor, one of the windings serving as a three phase sensor and the other winding producing the driving forces actuating the motor rotor.

5. A motor according to claim 1, wherein the motor rotor is in the form of a cup surrounding the motor stator and comprises a circular array of thin magnets of the type known as "tiles", which array is surrounded by a ring having great inertia and a flat multipole inducting magnet arranged at right-angles to the shaft, whereas the main three-phase winding of the motor stator is distributed over the periphery of a central cylindrical core, while the sensor winding is fixed on one of the circular faces of this core opposite the multipolar inducting magnet.

6. A motor according to claim 1 wherein the adjustable coupling provided to connect the rotor of the position sensor to the rotor shaft of the motor comprises two interengaging toothed rings.

7. A motor according to claim 1 having said three phase star connected stator winding wherein each pair of electronic switching means comprises a PNP power transistor and a NPN power transistor, means being provided for applying the signals from the position sensor to the bases of said transistors the emitters of which are connected to the positive and negative terminals of the D.C. supply and the collectors of which are connected to the free end of the corresponding phase winding.

8. A motor according to claim 1 having said three phase star connected stator winding, wherein each pair of electronic switching means for each phase winding comprises two power transistors of the same conductivity type, connected in opposition to the terminals of the D.C. supply respectively, a diode being arranged in series between the positive terminal of the supply and the collector of one of the transistors, and the collector of the other transistor being connected to the negative terminal of the supply.

9. A motor according to claim 1, wherein each pair of electronic switching comprises two power thyristors mounted in opposition, the gates of these thyristors being controlled by the position-sensor, and there are associated with each pair of power thyristors two extinguishing thyristors the gates of which are likewise controlled by the sensor, each extinguishing thyristor being arranged in parallel with the corresponding power thyristor and being connected to the latter through a condenser, a charging resistor being connected in series to the extinguishing thyristor and in parallel with the corresponding phase winding of the motor.

10. A motor according to claim 7, comprising a shunt arranged in series with the winding of at least one phase of the motor stator, this shunt being connected between the base and the emitter of an auxiliary transistor, the saturation of which causes the feed of the power transistor to be interrupted, and a tunnel diode being arranged in series with said shunt, whereby the current is limited when starting the motor.

11. A motor according to claim 7, comprising means for limiting the start-up current, including a power transistor in series with at least one phase of the motor stator, a biassing resistor connected between the base of said transistor end the opposite and of the corresponding phase winding, and a second resistor connected between the collector and the emitter of said transistor.

12. A motor according to claim 1, wherein the sensing-means includes a small heteropolar inductor similar to the motor rotor and rotated by the shaft of the motor, and a stator having ferromagnetic cores carrying induced coils so arranged as to produce polyphase voltages applied to control electrodes of the electronic switching means.

13. A motor according to claim 1, wherein the position sensor is formed by a variable coupling transformer comprising a magnetic core driven by the shaft of the motor and having two wide lateral pole pieces extending on a part of its periphery and a fixed central coil surrounding said core, an audio-frequency auxiliary oscillator to continuously feed the oscillations generated thereby to said central fixed coil, a plurality of induced coils the number of which is equal to the number of positions to be detected by the sensor and uniformly distributed around said central coils, magnetic cores on which said induced coils are arranged and having radially inwardly directed narrow pole pieces cooperating with said wide polar pieces of the central core to provide successive couplings between the central coil and the induced coils.

14. A motor according to claim 13 wherein the position sensor comprises three induced coils arranged around the central coil, and three transformers having their primary windings connected to said induced coils respectively and each provided with two secondary windings connected to the gate of a power thyristor and to the gate of an extinguishing thyristor respectively, rectifying means being provided between said secondary windings and said gates respectively to allow control pulses of appropriate polarity to be transmitted in each control circuit of said gates.

15. A motor according to claim 1, acting as a pilot motor to control the frequency of a polyphase power system, the wherein electronic switching means connected to the phase windings of said motor stator are simultaneously connected to the phase conductors of said system to supply said system with polyphase alternating currents resulting from the conversion of the D.C. energy of the D.C. supply, means being provided for adjusting the speed of the pilot motor.

16. A motor according to claim 8 wherein the two power transistors of each pair of electronic switching means comprises two NPN transistors.

* * * * *

UNITED STATES PATENT OFFICE
CERTIFICATE OF CORRECTION

Patent No. 3,806,785    Dated April 23, 1974

Inventor(s) Pierre Albert Marie DeValroger et al

It is certified that error appears in the above-identified patent and that said Letters Patent are hereby corrected as shown below:

Column 17, line 58, after "which" change "aries"
to --varies--;

Column 18, line 37, after "having great inertia"
insert --,--.

Column 19, line 25, after "transistor" change "end"
to --and--; after "opposite"
change "and" to --end--.

Signed and sealed this 5th day of November 1974.

(SEAL)
Attest:

McCOY M. GIBSON JR.
Attesting Officer

C. MARSHALL DANN
Commissioner of Patents